US010923993B2

(12) United States Patent
Okuda et al.

(10) Patent No.: US 10,923,993 B2
(45) Date of Patent: Feb. 16, 2021

(54) ALIGNMENT METHOD AND APPARATUS FOR ELECTRIC CONDUCTORS

(71) Applicant: HONDA MOTOR CO., LTD., Tokyo (JP)

(72) Inventors: Shuhei Okuda, Tochigi-ken (JP); Kenichi Ohno, Tochigi-ken (JP); Kenichi Omagari, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 15/891,444

(22) Filed: Feb. 8, 2018

(65) Prior Publication Data

US 2018/0233995 A1 Aug. 16, 2018

(30) Foreign Application Priority Data

Feb. 14, 2017 (JP) .............................. JP2017-024565

(51) Int. Cl.
*H02K 15/00* (2006.01)
*H01R 43/01* (2006.01)
*H01R 43/20* (2006.01)
*H02K 15/04* (2006.01)

(52) U.S. Cl.
CPC ........... *H02K 15/005* (2013.01); *H01R 43/01* (2013.01); *H01R 43/205* (2013.01); *H02K 15/0421* (2013.01)

(58) Field of Classification Search
CPC ...... H02K 1/04; H02K 15/085; H02K 15/005; H02K 15/0421; H01R 43/01; H01R 43/205
See application file for complete search history.

(56) References Cited

U.S. PATENT DOCUMENTS

| 3,914,859 | A | * | 10/1975 | Pierson | ............... H02K 1/16 |
| | | | | | 29/596 |
| 5,060,364 | A | * | 10/1991 | Scherer | ........... H02K 15/0018 |
| | | | | | 29/596 |

(Continued)

FOREIGN PATENT DOCUMENTS

| CN | 105556808 | 5/2016 |
| JP | 2003-324911 | 11/2003 |

(Continued)

OTHER PUBLICATIONS

Japanese Office Action for Japanese Patent Application No. 2018-139910 dated Jun. 4, 2019.

(Continued)

*Primary Examiner* — Carl J Arbes
(74) *Attorney, Agent, or Firm* — Amin, Turocy & Watson LLP

(57) ABSTRACT

An alignment apparatus is configured to include an alignment mechanism. At least one of first legs or second legs of electric conductors are retained so as to be aligned in an arcuate shape or a circular shape by a plurality of holders that make up the alignment mechanism. Thereafter, the plurality of holders are rotated. Accordingly, the electric conductors, which are aligned in an arcuate or circular shape, are rotated and arranged on the same circumference. In other words, the electric conductors are aligned in an annular shape.

7 Claims, 8 Drawing Sheets

(56) References Cited

U.S. PATENT DOCUMENTS

| | | | | |
|---|---|---|---|---|
| 6,141,865 | A * | 11/2000 | Kakutani | H02K 15/022 |
| | | | | 140/92.1 |
| 8,393,072 | B2 * | 3/2013 | Bodin | H02K 15/0478 |
| | | | | 29/596 |
| 8,667,666 | B2 * | 3/2014 | Sadiku | H02K 3/12 |
| | | | | 29/596 |
| 9,917,494 | B2 * | 3/2018 | Yamada | H02K 15/0421 |
| 10,523,097 | B2 * | 12/2019 | Yamada | H02K 15/085 |
| 2015/0207391 | A1 * | 7/2015 | Yamada | H02K 15/0421 |
| | | | | 29/825 |
| 2016/0233749 | A1 | 8/2016 | Ueno et al. | |

FOREIGN PATENT DOCUMENTS

| | | |
|---|---|---|
| JP | 2011-254680 | 12/2011 |
| WO | 2012/120643 | 9/2012 |
| WO | 2014010642 | 1/2014 |

OTHER PUBLICATIONS

Chinese Office Action for Chinese Patent Application No. 201810145803.4 dated Jul. 24, 2019.

* cited by examiner

ALIGNMENT METHOD AND APPARATUS FOR ELECTRIC CONDUCTORS

CROSS-REFERENCE TO RELATED APPLICATION

This application is based upon and claims the benefit of priority from Japanese Patent Application No. 2017-024565 filed on Feb. 14, 2017 the contents of which are incorporated herein by reference.

BACKGROUND OF THE INVENTION

Field of the Invention

The present invention relates to a method and apparatus for aligning electric conductors in slots of a stator core.

Description of the Related Art

A stator is known in which electric conductors (hereinafter also referred to as "segments") are inserted into two out of a plurality of slots formed along a circumferential direction of an annular stator core. In this case, the segments serve as an electromagnetic coil, and are electrically connected with respect to a control circuit. In this instance, each of the segments includes a first leg, a second leg extending in parallel with the first leg and facing toward the first leg, and a folded-back portion, which is curved and connected from the first let to the second leg, and for this reason, each of the segments has a substantially U-shaped configuration. Since the plurality of slots are formed in radiating shapes, for example, the first legs face toward an inner circumferential side, and the second legs face toward an outer circumferential side of the stator core.

After the plurality of segments have been aligned along the same circumference, or in other words, after the plurality of segments have been aligned in an annular shape, the first legs and the second legs are inserted into the slots while the shape thereof is maintained.

The applicant of the present invention, in International Publication No. WO 2014/010642, has proposed an alignment apparatus for aligning a plurality of segments in an annular shape. The alignment apparatus includes a plurality of holders arranged in radiating shapes along the diametrical direction of a circle, and an alignment mechanism for moving the holders in the diametrical direction. Initially, the holders themselves are disposed at positions spaced apart from each other while retaining at least one and typically from four to eight segments, and in such a state, the holders are moved toward the center of the circle under the action of the alignment mechanism. Stated otherwise, the holders are moved in close proximity to each other. Along therewith, the segments are aligned in an annular shape.

Thereafter, the segments are gripped by a gripping mechanism that constitutes part of a transport mechanism and are extracted from the holders. The segments are transported to the stator core, and distal ends of the first legs and the second legs are inserted into the slots. Furthermore, the gripping mechanism releases the segments, whereby the first legs and the second legs descend along the slots.

SUMMARY OF THE INVENTION

The present invention has been devised in relation to the aforementioned conventional art, and has the object of providing an alignment method for aligning electric conductors, which facilitates alignment of the electric conductors in an annular shape, as well as providing an alignment apparatus for electric conductors which can be made compact.

In order to achieve the aforementioned object, the present invention is characterized by an alignment method for electric conductors for aligning the electric conductors in an annular shape, the electric conductors each having a first leg and a second leg extending substantially in parallel with each other, and a folded-back portion continuous with the first leg and the second leg, comprising:

a retaining step of retaining the electric conductors by a plurality of holders in a state in which at least one of the first legs and the second legs thereof are supported and aligned in an arcuate shape or a circular shape; and a main alignment step of aligning the electric conductors in an annular shape, by rotating and arranging the electric conductors, which have been aligned in an arcuate shape or a circular shape by rotating the plurality of holders, on the same circumference.

More specifically, in the present invention, the electric conductors are moved toward the center of a circle, whereby the electric conductors are not arranged on the circumference, but are moved toward the center of the circle by rotating the electric conductors, and consequently, the electric conductors are arranged so as to be on the circumference. Therefore, it is easy to align the electric conductors on the circumference. In addition, in this case, the positions of the electric conductors prior to being aligned in an annular fashion (before rotation thereof) are in closer proximity to each other as compared with the case in which they are arranged radially. Therefore, it is possible to align the electric conductors in a narrow space.

For arranging the electric conductors circumferentially, for example, the electric conductors which have been aligned in an arcuate shape may be rotated. In this case, a preliminary alignment step of aligning the electric conductors in an arcuate shape is preferably performed prior to the retaining step. In accordance with this feature, it becomes easy to retain the electric conductors in the holders, and therefore, the electric conductors can be arranged in an annular shape more efficiently.

The present invention is further characterized by an alignment apparatus for electric conductors, which is adapted to align the electric conductors in an annular shape, the electric conductors each having a first leg and a second leg extending substantially in parallel with each other, and a folded-back portion continuous with the first leg and the second leg, comprising:

a plurality of holders adapted to retain the electric conductors in a state in which at least one of the first legs and the second legs thereof are supported and aligned in an arcuate shape or a circular shape; and an alignment mechanism adapted to align the electric conductors in an annular shape, by rotating the plurality of holders, and together therewith, rotating and arranging the electric conductors, which are aligned in an arcuate shape or a circular shape, on the same circumference.

By adopting such a configuration, it is easy to rotate the electric conductors and to focus or converge the electric conductors at the center of a circle, as well as to arrange the electric conductors on the circumference thereof. For this reason, it is possible to arrange the electric conductors on the circumference in a narrow space, and therefore, the alignment apparatus can be simplified and made compact.

In order to individually hold the electric conductors with the holders, insertion holes into which one of the first legs or the second legs are inserted may be formed in the respective holders. In this case, for example, the folded-back portions are blocked to thereby position and fix the electric conductors. More specifically, the height positions of the electric conductors which are held by the holders are uniformly aligned. In this state, the electric conductors are aligned on the circumference and inserted into the slots of the stator core, and therefore, there is no need to perform an operation to uniformly align the height positions of the electric conductors. Accordingly, operational efficiency up until a point at which the stator is obtained can be enhanced.

Bottomed insertion holds in which one of the first legs or the second legs are inserted may be formed in the respective holders. In this case, distal ends of the first legs or the second legs may be blocked at the bottoms of the bottomed insertion holes. In accordance with this configuration as well, it is possible to position and fix the electric conductors in a state in which the height positions thereof are uniformly aligned.

Each of the holders may have a configuration including, for example, a first leg holder adapted to hold the first leg, and a second leg holder adapted to hold the second leg. In this case, the insertion hole of the first leg holder may include a first opening formed so as to extend along a longitudinal direction of the first leg, and the insertion hole of the second leg holder may include a second opening formed so as to extend along a longitudinal direction of the second leg. In accordance with this feature, since sliding resistance at the time of insertion is reduced, the occurrence of scratches or the like on the electric conductors is prevented.

When the first opening and the second opening face in the same direction, there is a concern that the first leg and the second leg could fall out from the first insertion hole and the second insertion hole. In order to avoid this, the phase difference between the first opening and the second opening preferably is set substantially to 180°.

The alignment mechanism may be constituted so as to include, for example, a plurality of arm members in which the plurality of holders are individually disposed, a plurality of gears connected respectively to ends of the individual arm members and arranged on a circumference, gear support plates on which the plurality of gears are disposed, and a rotating mechanism for rotating the plurality of gears. In this case, the arm members rotate in following relation with rotation of the gears. Stated otherwise, with a simple configuration, it becomes possible for the electric conductors to be easily arranged on the circumference.

As described above, it is preferable for the alignment apparatus to be constituted to include a preliminary alignment mechanism adapted to align the electric conductors in an arcuate shape. This is because, by arranging the electric conductors in an arcuate shape in advance, retention of the electric conductors in the holders is facilitated.

According to the present invention, the electric conductors are rotated and moved toward the center of a circle, whereby the electric conductors are arranged along the circumference thereof. Therefore, it is easy to align the electric conductors on the circumference. In addition, since turning thereof is performed to a certain degree, it is possible for the electric conductors to be aligned on the circumference in a narrow space. Due to this reason, the alignment apparatus can be simplified and made compact.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of an alignment method for aligning electric conductors according to the present invention will be described below with reference to the accompanying drawings, in relation to an alignment apparatus for implementing the same. In the descriptions below, the electric conductors will also be referred to as "segments".

Figure 1:
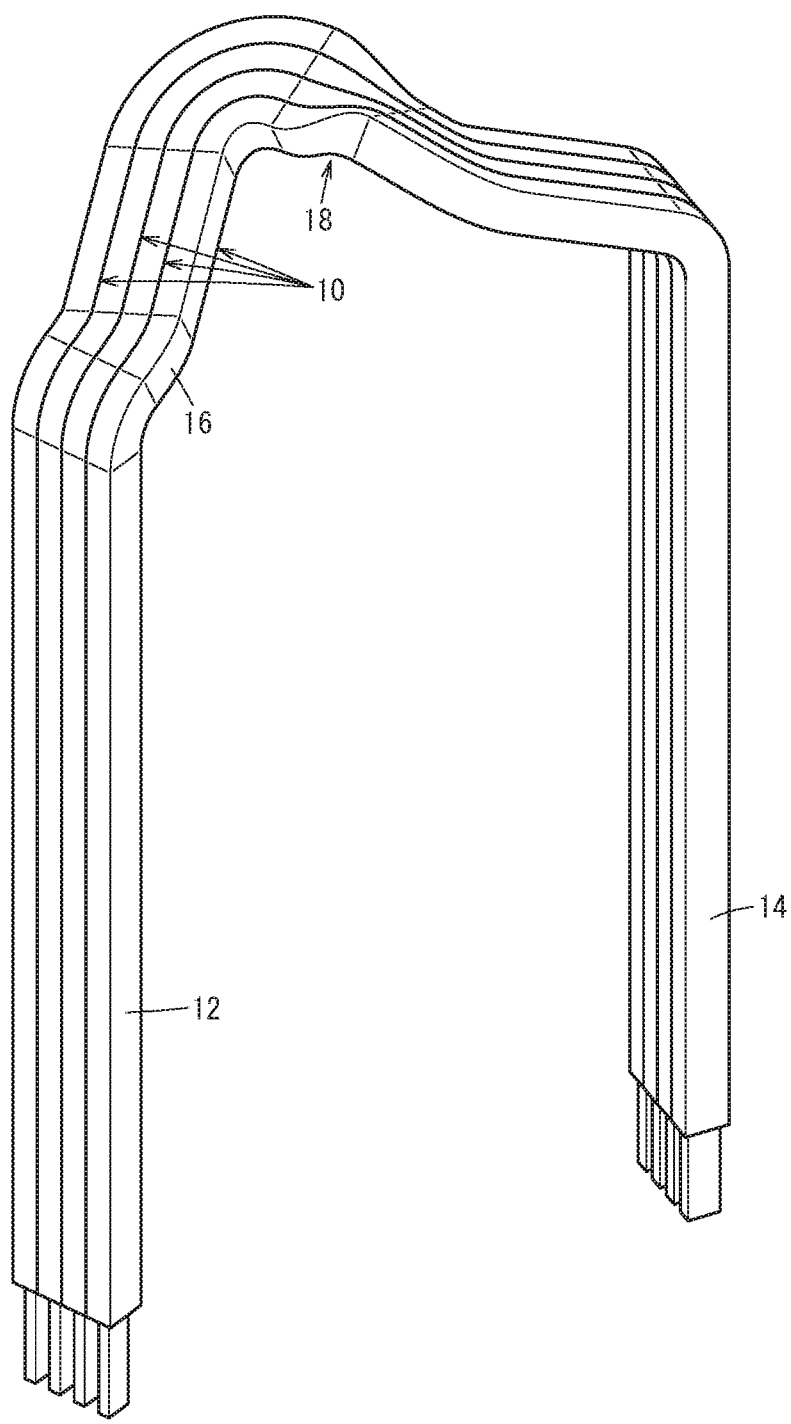
FIG. 1 is an overall schematic perspective view showing a state in which segments in the form of electric conductors are bundled.

First, the segments 10 shown in FIG. 1 will be described. In FIG. 1, a state is shown in which four of the segments 10 are bundled together.

Each of the segments 10 includes a first leg 12, a second leg 14 extending parallel to the first leg 12, and a turn portion 16 (folded-back portion) interposed between the first leg 12 and the second leg 14. The turn portion 16 is curved so as to be folded back from the first leg 12 toward the second leg 14, and therefore, each of the segments 10 has a substantially U-shaped configuration.

A meandering crank portion 18 is formed on the turn portion 16. Due to the crank portion 18, a deviation occurs in each of the segments 10 in a direction along the radial direction of the stator core 20 (see FIG. 8).

With the segments 10 having the above-described shape, the first legs 12 thereof are inserted into one, and the second legs 14 thereof are inserted into another one of a plurality of slots provided in the stator core 20. As a result, the segments 10 form an electrical path between the two slots. Stated otherwise, a conductive state is formed between the slots into which the first legs 12 are inserted and the slots into which the second legs 14 are inserted.

Thereafter, each of the first legs 12 and the second legs 14 are appropriately joined to a first leg 12 or a second leg 14 of another segment 10. As a result, an electromagnetic coil composed of a plurality of the segments 10 is formed to thereby constitute a stator. In one of the slots, the first legs 12 of the four segments 10 and the second legs 14 of four different segments 10 are aligned from an inner circumferential side to an outer circumferential side, and therefore, a total of eight legs are aligned alongside one another.

The plurality of segments 10 are aligned in an annular shape, and in this state, the segments 10 are transported to the stator core 20, and the first legs 12 and the second legs 14 are inserted into the slots. Next, a detailed description will be given concerning an alignment apparatus for aligning the segments 10 in an annular shape.

Figure 2:
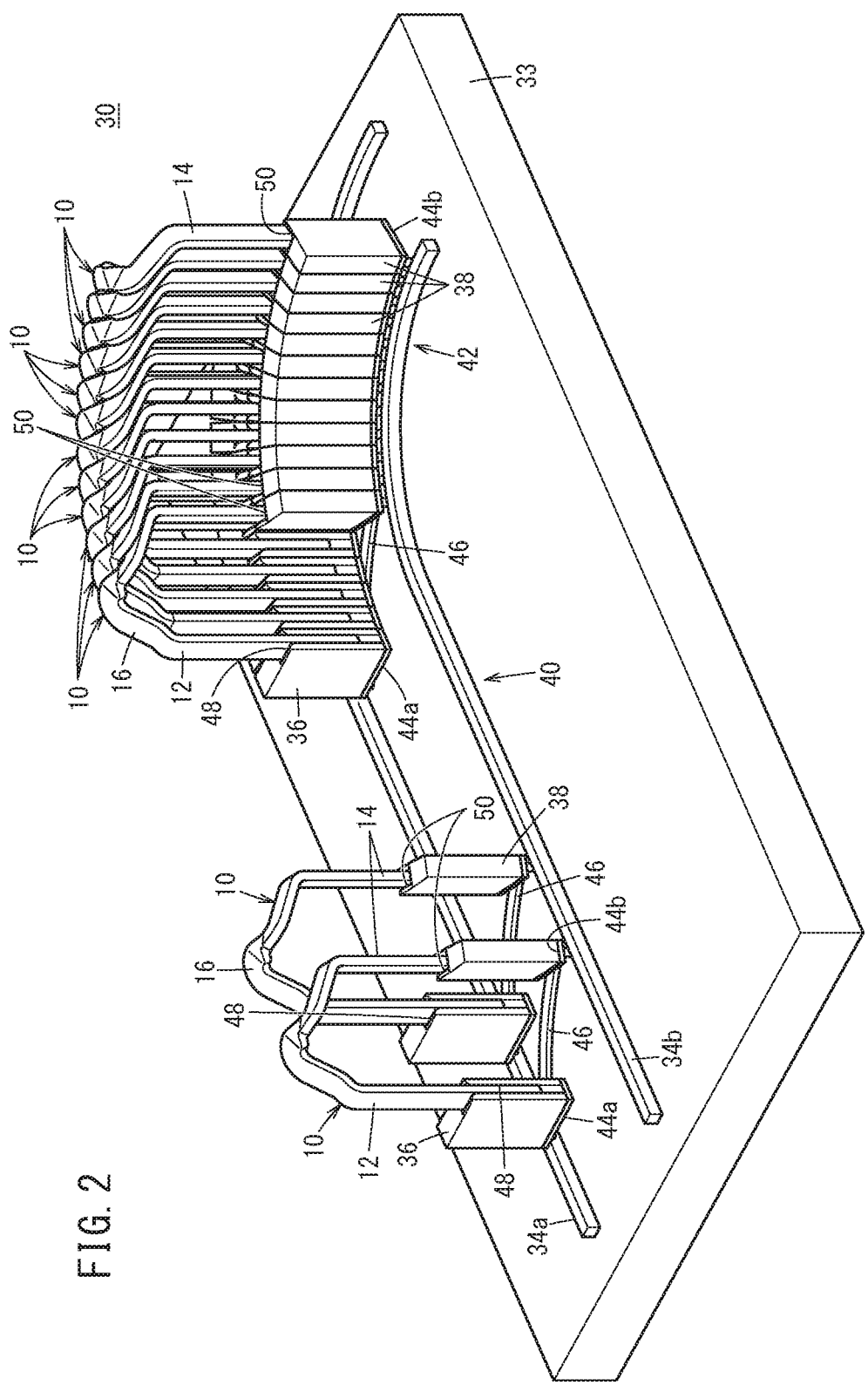
FIG. 2 is a schematic perspective view of essential parts of a preliminary alignment mechanism constituting part of an alignment apparatus according to a first embodiment of the present invention.
Figure 3:
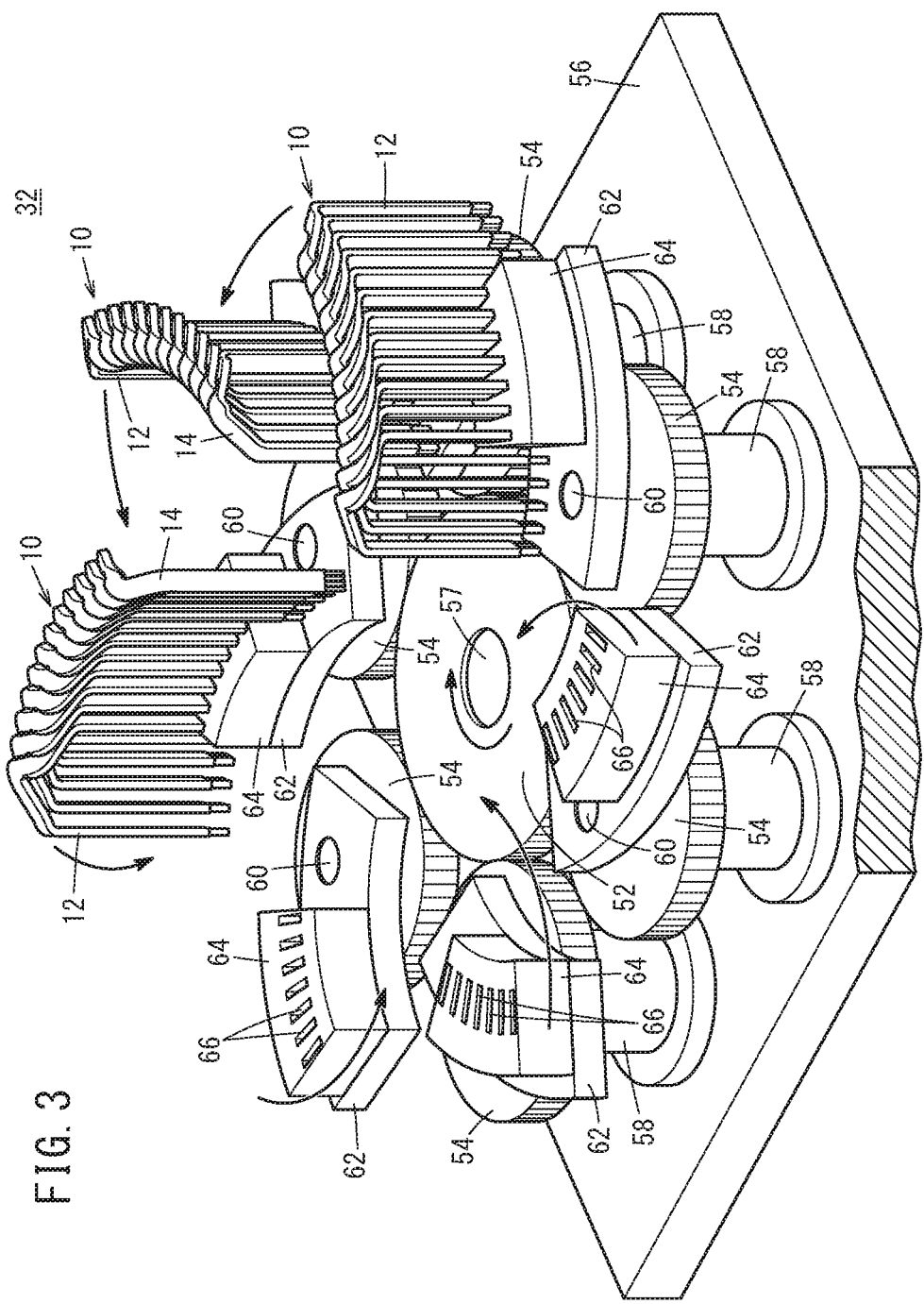
FIG. 3 is a schematic perspective view of essential parts of a rotary type main alignment mechanism which constitutes the alignment apparatus together with the preliminary alignment mechanism of FIG. 2.

An alignment apparatus according to a first embodiment includes a preliminary alignment mechanism 30 as shown in FIG. 2, and a rotary type main alignment mechanism 32 as shown in FIG. 3. First, the preliminary alignment mechanism 30 will be described.

As shown in FIG. 2, the preliminary alignment mechanism 30 includes a pair of guide rails 34a, 34b formed on a base 33, and first columnar holders 36 and second columnar holders 38 which are displaced along the guide rails 34a, 34b. Thereamong, the guide rails 34a, 34b are constituted by connecting arcuately curved portions 42 with respect to parallel portions 40 which are mutually arranged in parallel with each other.

Sliders 44a are slidably engaged with the guide rail 34a. The sliders 44a support the first columnar holders 36. On the other hand, the sliders 44b that support the second columnar holders 38 are slidably engaged with the guide rail 34b. Furthermore, bridge members 46 bridge over between the sliders 44a and the sliders 44b. One of the sliders 44a, 44b is capable of moving under the action of a non-illustrated drive source. As a result, the sliders 44a, 44b are displaced along the guide rails 34a, 34b together with the first columnar holders 36 and the second columnar holders 38.

The sliders 44a extend in directions substantially perpendicular to the directions in which the parallel portions 40 of the guide rails 34a, 34b extend. The first columnar holders 36, which are disposed on upper surfaces of the sliders 44a, extend along the same directions as the sliders 44a. More specifically, the longitudinal directions of the first columnar holders 36 are directions oriented from the guide rail 34a toward the guide rail 34b. Distal end surfaces of the first columnar holders 36 which face toward the guide rail 34b are cut out so as to be recessed in substantially U-shapes toward the side of the guide rail 34a, and in accordance therewith, first retaining grooves 48 are formed therein.

The bridge members 46 are inclined with respect to the direction in which the parallel portions 40 of the guide rails 34a, 34b extend, together with being slightly curved. The second columnar holders 38 are supported at distal ends of the bridge members 46 on the side of the guide rail 34b, in a manner so that the longitudinal directions thereof are inclined with respect to the direction in which the parallel portions 40 of the guide rails 34a, 34b extend.

Second retaining grooves 50 are formed in the second columnar holders 38. The second retaining grooves 50 are formed by cutting out distal end surfaces of the second columnar holders 38 that face toward the guide rail 34a, so as to be recessed in substantially U-shapes toward the side of the guide rail 34b. Because the longitudinal directions of the second columnar holders 38 do not coincide with the longitudinal directions of the first columnar holders 36, the first retaining grooves 48 and the second retaining grooves 50 do not face toward each other.

The first legs 12 are inserted into the first retaining grooves 48, whereas the second legs 14 are inserted into the second retaining grooves 50. Consequently, the segments 10 are retained by the first columnar holders 36 and the second columnar holders 38. As can be understood from this fact, the first columnar holders 36 and the second columnar holders 38 are mounted on the bridge members 46 in corresponding relation to the bent nature of the crank portions 18 of the segments 10.

One first leg 12 and one second leg 14, for example, are inserted into each of the first retaining grooves 48 and the second retaining grooves 50, however, on the order of two to four of the segments 10 may be bundled together, and two to four of the first legs 12 and the second legs 14 may also be inserted into the first retaining grooves 48 and the second retaining grooves 50. The dimension and volume of the first retaining grooves 48 and the second retaining grooves 50 are set beforehand, in accordance with the number of the first legs 12 and the second legs 14 to be inserted therein.

The sliders 44a, 44b, the first columnar holders 36, and the second columnar holders 38 are displaced from the parallel portions 40 to the curved portions 42 under the action of the aforementioned drive source. The curved portions 42 form a terminal point of the guide rails 34a, 34b, and the segments 10, which are retained by the first columnar holders 36 and the second columnar holders 38, are transferred to and gathered together at the curved portions 42.

The other rotary type main alignment mechanism 32 has a drive gear 52, as shown in FIG. 3. A plurality of driven gears 54 (six in the case of FIG. 3) are enmeshed with the drive gear 52. In order to facilitate understanding, in FIG. 3, a portion of the segments 10 are omitted from illustration. The same feature also applies to FIG. 5, to be described later.

More specifically, an alignment motor (not shown), which serves as a rotating mechanism, is erected on a base 56 in a manner so that a rotary shaft 57 thereof faces vertically upward. The drive gear 52 is externally fitted onto a distal end of the rotary shaft 57. On the other hand, the driven gears 54 are disposed rotatably on respective upper end surfaces of a plurality of cylindrical members 58 erected on the base 56 in surrounding relation to the alignment motor. Of course, all of the driven gears 54 rotate simultaneously in following relation with rotation of the drive gear 52.

Arcuately shaped pedestals 62 are positioned and fixed respectively to each of the driven gears 54 via retaining shafts 60, which are connected to centers of rotation of the driven gears 54. Further, respective arcuately shaped holders 64 are positioned and fixed to end portions of each of the pedestals 62. More specifically, the arcuately shaped holders 64 are disposed at a distance away from the centers of rotation of the driven gears 54. Further, the diameters of the pedestals 62 are greater than the diameters of the driven gears 54, and therefore, portions of the arcuately shaped holders 64 protrude from the peripheral edge of the driven gears 54. When the driven gears 54 are rotated, the pedestals 62 and the arcuately shaped holders 64 rotate integrally therewith.

Figure 4:
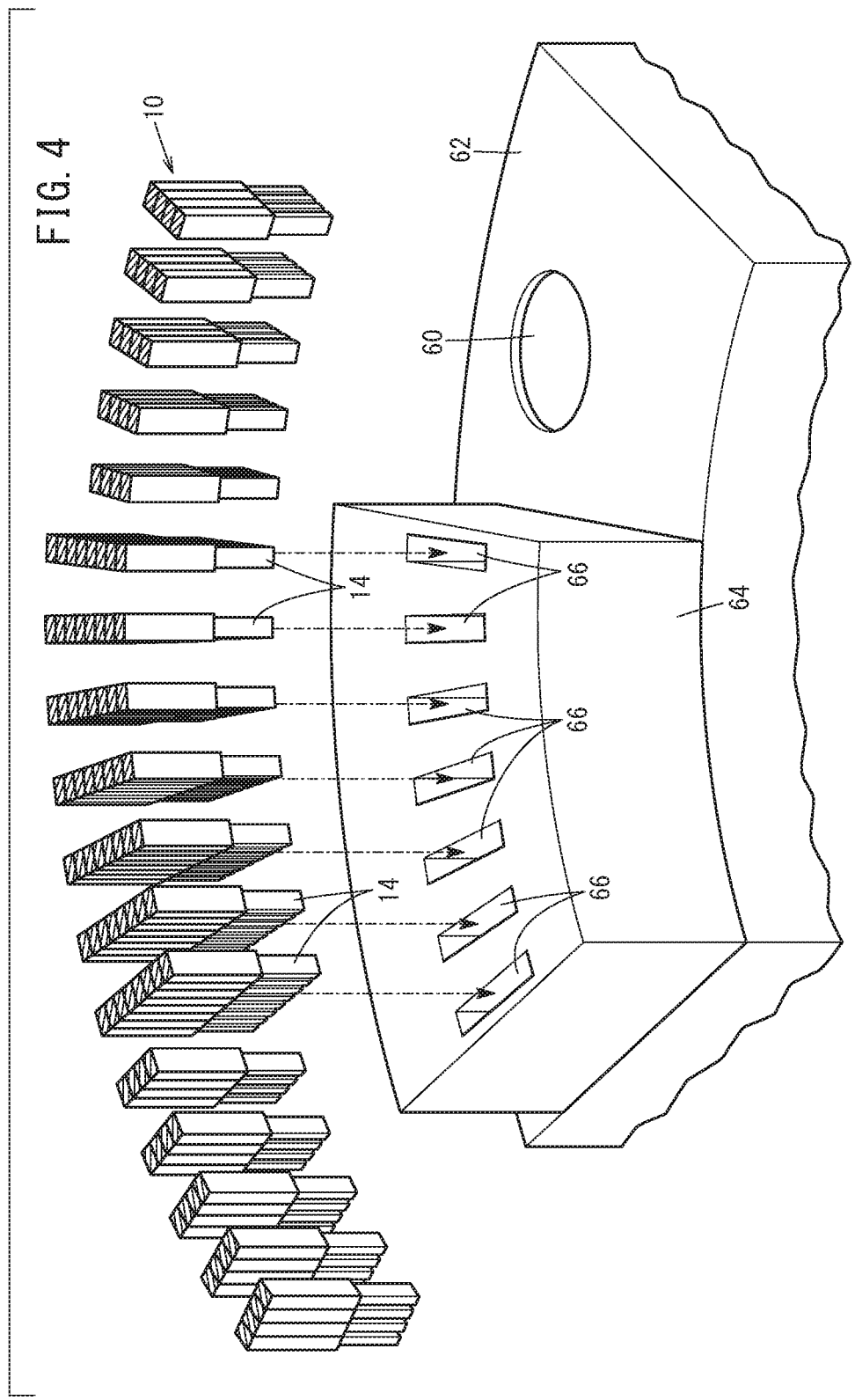
FIG. 4 is a perspective view of essential parts of an arcuately shaped holder constituting part of the rotary type main alignment mechanism of FIG. 3.

As shown in FIG. 4, a plurality of bottomed retaining holes 66 are formed in each one of the arcuately shaped holders 64 along the arcuate shape thereof. The first legs 12 of at least one and typically four segments 10, and the second legs 14 of another four segments 10 are inserted into each one of the retaining holes 66. The retaining holes 66 are set with depths so that the segments 10 of which the second legs 14 are inserted can stand sufficiently stably.

The alignment apparatus further includes a first transport mechanism for transporting the segments 10, which have been aligned in an arcuate shape by the preliminary alignment mechanism 30, to the rotary type main alignment mechanism 32 while maintaining the state in which the segments 10 are aligned in arcuate shapes, and a second transport mechanism for transporting the segments 10, which exhibit an annular shape by being aligned on the circumference by the rotary type main alignment mechanism 32, to the stator core 20 (neither of the first transport mechanism or the second transport mechanism is shown). As preferred examples of the first transport mechanism and second transport mechanism, a robot may be cited.

The alignment apparatus according to the first embodiment is configured to include the preliminary alignment mechanism 30 and the rotary type main alignment mechanism 32, which are constructed basically as described above. Next, operations and effects thereof will be described in relation to an alignment method for aligning the segments 10 according to the first embodiment. Unless otherwise specified, the following steps are carried out in accordance with a sequence control performed by a non-illustrated control circuit.

According to the first embodiment, initially, a preliminary alignment process is performed in order to align a plurality of the segments 10 in arcuate shapes. For this purpose, the first legs 12 are inserted into the first retaining grooves 48 of the first columnar holders 36, and the second legs 14 are inserted into the second retaining grooves 50 of the second columnar holders 38 that make up the preliminary alignment mechanism 30 (see FIG. 2). As was described above, the number of legs to be inserted may be one, or may be from two to four. In the case that a plurality of legs are inserted, the segments 10 may be bundled together in advance.

At this point in time, all of the first columnar holders 36 and the second columnar holders 38 are located in the parallel portions 40 of the guide rails 34*a*, 34*b*. Thus, next, the drive source is energized to move the sliders 44*a*, 44*b* along the guide rails 34*a*, 34*b* to the curved portions 42 thereof. The first columnar holders 36, the second columnar holders 38, the bridge members 46, and the segments 10 are moved to the curved portions 42 integrally with the sliders 44*a*, 44*b*.

The curved portions 42 form the terminal point of the guide rails 34*a*, 34*b*, and therefore, the first columnar holders 36 and the second columnar holders 38 come to a stop at the curved portions 42. By repeatedly carrying out transfer and stopping of the segments 10 in the manner described above, a predetermined number of segments 10 are gathered together in the curved portions 42 so as to form an arcuate shape. At this time, front and rear portions of the first columnar holders 36 and the second columnar holders 38 come into contact with each other sequentially, and the crank portions 18 overlap one another.

Thereafter, the first transport mechanism (for example, a robot) is suitably operated in order to grip and lift up a predetermined number of the segments 10 which have been formed in an arcuate shape. Consequently, the first legs 12 and the second legs 14 are separated respectively from the first retaining grooves 48 and the second retaining grooves 50.

Next, the retaining step is performed. More specifically, by further operation of the first transport mechanism, the segments 10 are transported to the rotary type main alignment mechanism 32 while the arcuate shape thereof is maintained, and together therewith, the first legs 12 or the second legs 14 are inserted into the retaining holes 66 of the arcuately shaped holders 64. As a result, the arcuately shaped segments 10 are held by the arcuately shaped holders 64.

Next, the main alignment step is performed. Specifically, the alignment motor is energized. In following relation thereto, the rotary shaft 57 of the alignment motor, and the drive gear 52 that is fitted onto the rotary shaft 57 are rotated. Since all of the driven gears 54 are engaged with the drive gear 52, the respective driven gears 54 are driven and rotate together synchronously. Along therewith, the arcuately shaped holders 64, which are disposed on the driven gears 54 through the pedestals 62, and the segments 10 that are held by the arcuately shaped holders 64 move in the directions indicated by the arrows in FIG. 3.

Figure 5:
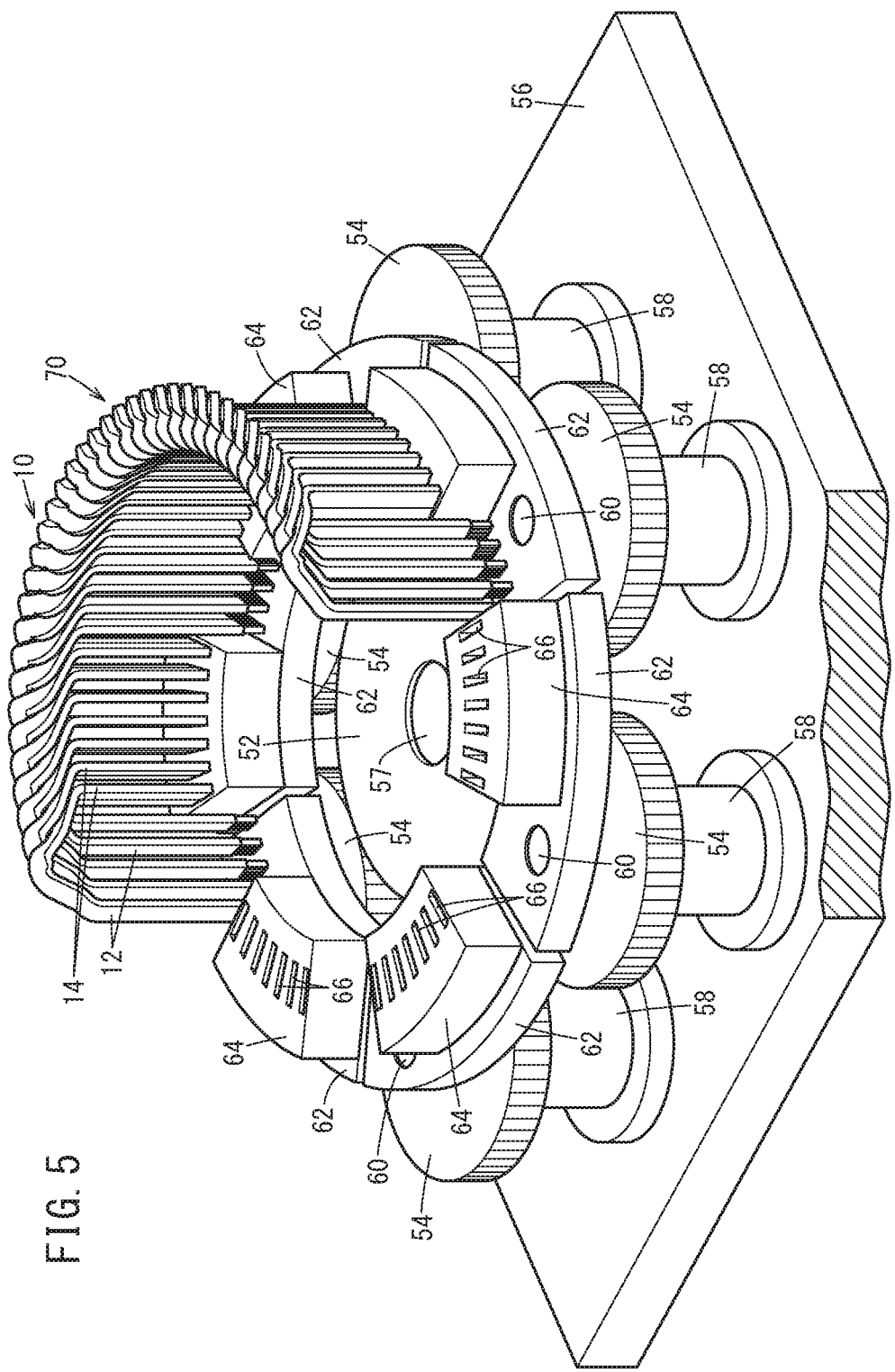
FIG. 5 is a schematic perspective view of essential parts showing a state in which segments are arranged on a circumference and an annular shaped body is formed by the rotary type main alignment mechanism of FIG. 3.

More specifically, the arcuately shaped holders 64 and the segments 10 are rotated in a manner so that one end thereof faces inwardly of an imaginary circle. As a result, as shown in FIG. 5, the segments 10 themselves are joined continuously so as to be aligned on the circumference. Stated otherwise, an annular shaped body 70 is formed by the predetermined number of segments 10. The second transport mechanism (for example, a robot) grips and lifts up the annular shaped body 70, and accordingly, the first legs 12 and the second legs 14 are detached and separated from the retaining holes 66. The second transport mechanism further conveys the annular shaped body 70 to the stator core 20, and inserts the first legs 12 and the second legs 14 into the slots thereof. Thereafter, the segments 10 are twisted as necessary, and the first legs 12 and the second legs 14 are further joined to the first legs 12 or the second legs 14 of other segments 10. Consequently, the stator is obtained.

In the foregoing manner, according to the first embodiment, by a simple operation, a predetermined number of the segments 10 can be arranged and aligned so as to form the annular shaped body 70. Further, in order to obtain the annular shaped body 70, the segments 10, which have been aligned in an annular shape, may be moved by rotation of the driven gears 54. Accordingly, it is possible to constitute the rotary type main alignment mechanism 32 in a more compact manner, as compared with an alignment apparatus according to the conventional art in which the holders thereof are disposed radially.

In the first embodiment, the preliminary alignment mechanism 30 need not necessarily be provided, and may be omitted. In this case, the alignment mechanism is made up from only the rotary type main alignment mechanism 32. The operator may sequentially insert the second legs 14 of the segments 10 into the retaining holes 66 of the arcuately shaped holders 64. Alternatively, it is also possible to use a converging mechanism in which two to four segments 10 are linearly aligned (bundled together). In this case, a preliminary transport mechanism may be provided, which is adapted to transport a bundle of segments 10 from the converging mechanism to the retaining holes 66 of the arcuately shaped holders 64.

Next, an alignment apparatus and an alignment method according to a second embodiment will be described.

Figure 6:
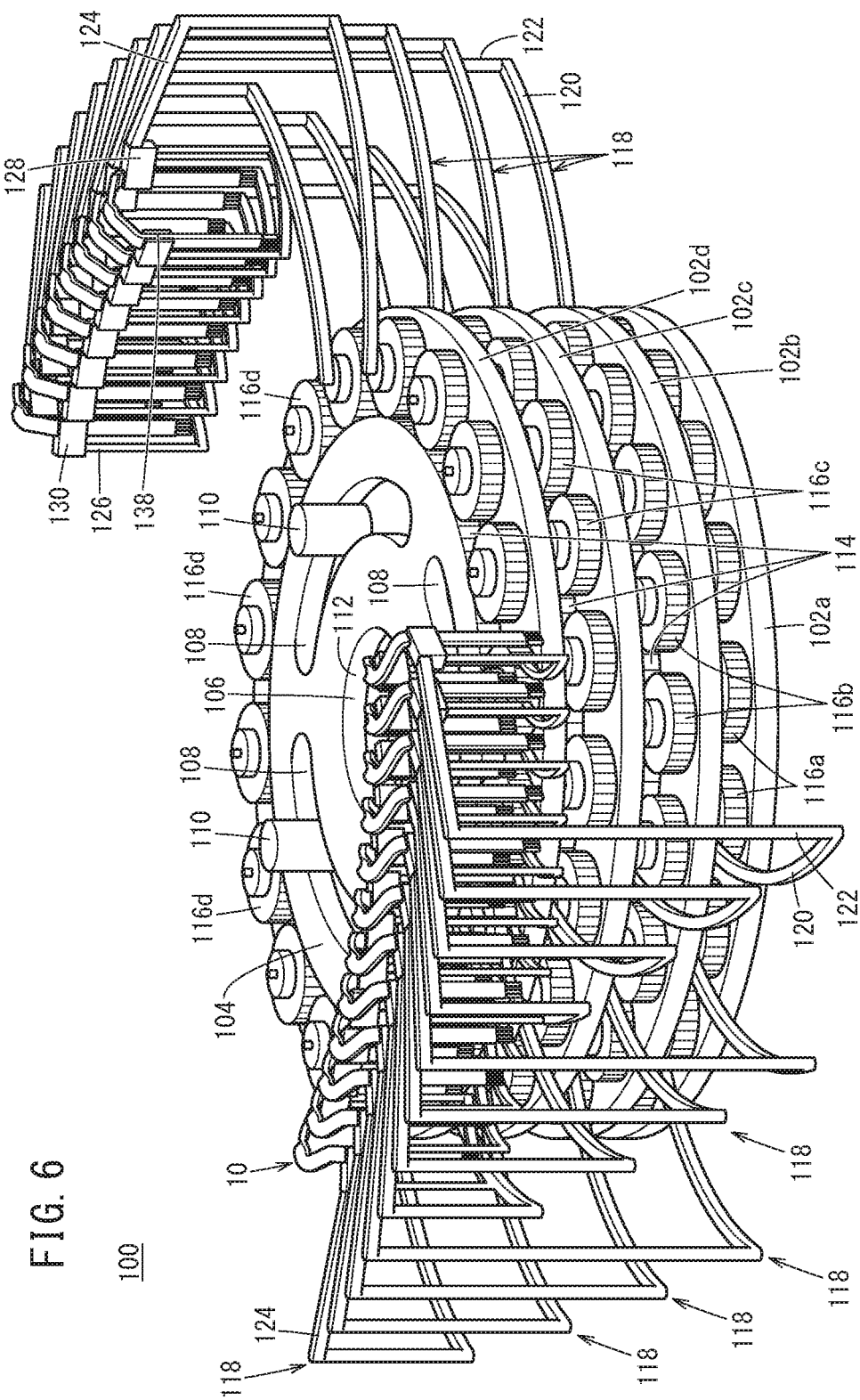
FIG. 6 is a schematic perspective view of essential parts of a diameter reducing type of alignment mechanism constituting an alignment apparatus according to a second embodiment of the present invention.

FIG. 6 is a schematic perspective view of essential parts of a diameter reducing type of alignment mechanism 100 constituting an alignment apparatus according to the second embodiment. The diameter reducing type of alignment mechanism 100 includes a first gear support plate 102*a* through a fourth gear support plate 102*d* disposed at positions overlapping one another as viewed in plan.

Gear plates 104 are disposed respectively on each of the first gear support plate 102a through the fourth gear support plate 102d. Large diameter through holes 106 are formed at the centers of the first gear support plate 102a through the fourth gear support plate 102d and the gear plates 104, together with three arcuate holes 108 being formed around the through holes 106. Stopper shafts 110 are passed respectively through each of the arcuate holes 108.

Non-illustrated internal gear teeth are formed on the inner circumferential walls of the through holes 106 of the gear plates 104, thereby constituting respective internal gears 112. A rotary shaft of the non-illustrated alignment motor (rotation mechanism) is passed through the through holes 106, and a non-illustrated drive gear that is fitted over the rotary shaft is enmeshed with the internal gears 112. Furthermore, external gears 114 are constituted by forming external gear teeth on the outer circumferential walls of the gear plates 104.

A plurality (for example, eighteen) arm drive gears with external gear teeth formed on outer circumferential walls thereof are provided along a circumferential direction on circumferential edge portions of the first gear support plate 102a through the fourth gear support plate 102d. Hereinafter, the arm drive gear provided on the first gear support plate 102a will be referred to as a "first arm gear", and the reference numeral therefor will be designated as 116a. Similarly, the arm drive gears provided respectively on the second gear support plate 102b, the third gear support plate 102c, and the fourth gear support plate 102d will be referred to as a "second arm gear 116b", a "third arm gear 116c", and a "fourth arm gear 116d". The first arm gear 116a through the fourth arm gear 116d are enmeshed with the external gears 114.

The centers of rotation of the first arm gear 116a, the second arm gear 116b, the third arm gear 116c, and the fourth arm gear 116d are slightly offset mutually from each other. In other words, the respective arm drive gears overlap one another to a certain extent. For this reason, the arm members 118 that are connected to each of the first arm gear 116a through the fourth arm gear 116d are prevented from interfering with each other.

As described above, the arm members 118 are connected respectively to the first arm gear 116a through the fourth arm gear 116d. More specifically, for example, seventy-two individual arm members 118 are provided. In FIG. 5, several of the arm members 118 are shown representatively in order to facilitate understanding of the shape and form, etc., of the arm members 118.

Each of the arm members 118 is made up from a base portion 120 connected to any one of the first arm gear 116a through the fourth arm gear 116d, a rising portion 122 that rises substantially vertically from the base portion 120, a horizontal portion 124 which is bent at approximately 90° from the rising portion 122 and extends in a substantially horizontal direction, and a U-shaped portion 126 which is branched into a substantially U-shape from the horizontal portion 124. First leg holders 128 are provided at upper ends of the horizontal portions 124, and second leg holders 130 are provided at distal ends of the U-shaped portions 126.

Figure 7:
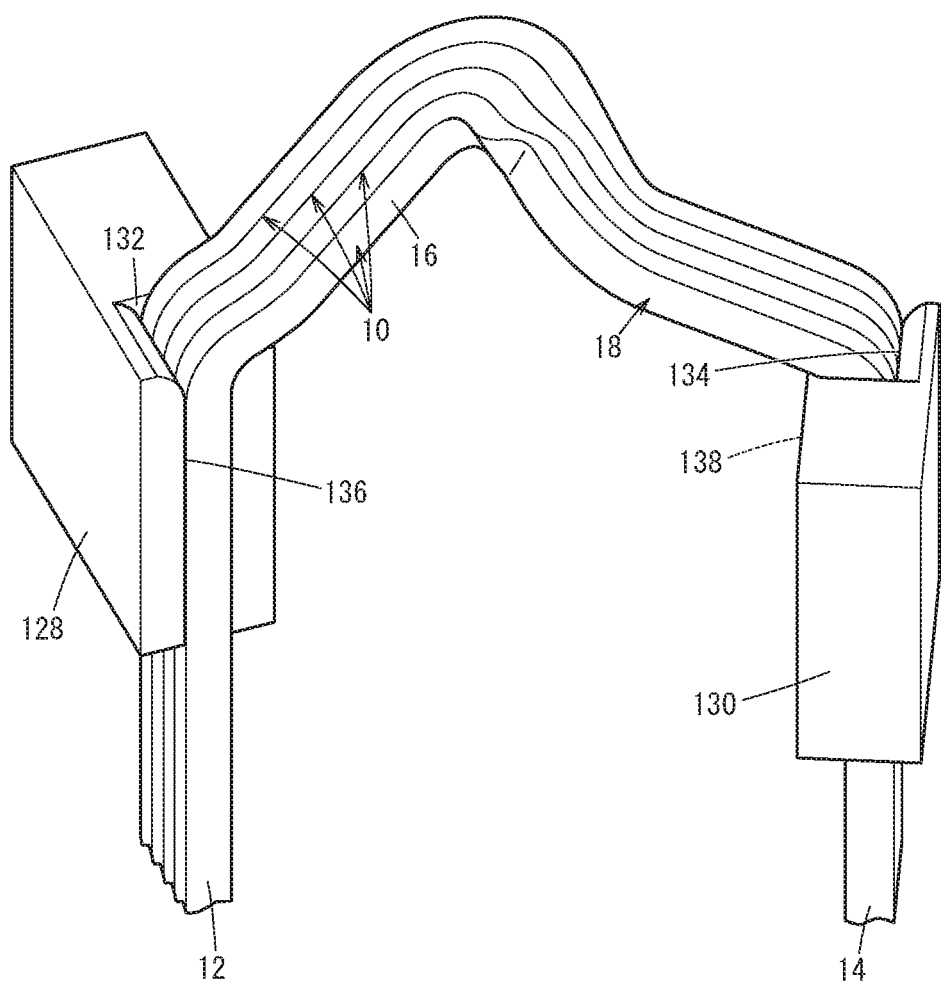
FIG. 7 is an enlarged perspective view of essential parts showing a state in which segments are held by first leg holders and second leg holders which constitute the diameter reducing type of alignment mechanism of FIG. 6.

As shown in FIG. 7, in the first leg holders 128 and the second leg holders 130, first insertion holes 132 and second insertion holes 134 are formed respectively along the longitudinal direction thereof. The first insertion holes 132 include first openings 136 formed so that portions of the first leg holders 128 are cut out so as for the first openings 136 to extend along the longitudinal direction thereof. More specifically, the first insertion holes 132 are opened not only at the longitudinal end face of the first leg holders 128 but also on the side surfaces thereof.

In the same manner, the second insertion holes 134 include second openings 138 formed so that portions of the second leg holders 130 are cut out so as for the second openings 138 to extend along the longitudinal direction thereof. The phase difference between the first openings 136 and the second openings 138 is set substantially to 180°.

One first leg 12 and one second leg 14, for example, are inserted into each of the first insertion holes 132 and the second insertion holes 134, however, on the order of two to four of the segments 10 may be bundled together, and two to four of the first legs 12 and the second legs 14 may also be inserted into the first insertion holes 132 and the second insertion holes 134. In this case, the dimension and volume of the first insertion holes 132 and the second insertion holes 134 are set beforehand, in accordance with the number of the first legs 12 and the second legs 14 to be inserted therein. In FIG. 7, a state is shown in which four of the segments 10 are bundled together and retained therein.

The alignment apparatus according to the second embodiment does not include the preliminary alignment mechanism 30 shown in FIG. 2, or the first transport mechanism for conveying the arcuately aligned segments 10 from the preliminary alignment mechanism 30 to the diameter reducing type of alignment mechanism 100. More specifically, in this case, the segments 10 are aligned by the diameter reducing type of alignment mechanism 100.

Basically, the operations and effects of the alignment apparatus, which includes the diameter reducing type of alignment mechanism 100 configured in the manner described above, will be described in relation to a method for aligning the segments 10 according to the second embodiment. Unless otherwise specified, the following steps are carried out under a sequence control performed by a non-illustrated control circuit, in the same manner as in the first embodiment.

An operator sequentially inserts the first legs 12 and the second legs 14 into each of the first insertion holes 132 of the first leg holders 128, and the second insertion holes 134 of the second leg holders 130, which are provided on the arm members 118 that are connected to the first arm gears 116a through the fourth arm gears 116d. If necessary, a converging mechanism that aligns two to four of the segments 10 in a linear shape may be used, and the bundled segments 10 may be transported by a preliminary transport mechanism, together with inserting the bundled segments into the first leg holders 128 and the second leg holders 130. In accordance therewith, the retaining step is performed.

In this instance, the first insertion holes 132 are opened at the first openings 136, and the second insertion holes 134 are opened at the second openings 138. Therefore, sliding resistance of the first legs 12 and the second legs 14 with respect to the inner walls of the first insertion holes 132 and the second insertion holes 134 is reduced, and together therewith, the first leg holders 128 and the second leg holders 130 are expanded (elastically deformed) comparatively easily. Accordingly, the occurrence of scratches on the segments 10 when the first legs 12 and the second legs 14 are inserted into the first insertion holes 132 and the second insertion holes 134 can be avoided.

The phase difference between the first openings 136 and the second openings 138 is substantially 180°. Stated otherwise, the first openings 136 and the second openings 138 open in directions opposite to each other. Consequently, instability in retention of the first legs 12 by the first leg holders 128, and retention of the second legs 14 by the second leg holders 130 is avoided, and the segments 10 are prevented from falling out from the arm members 118.

The boundaries between the first legs 12 and the turn portions 16 are placed in contact with the first leg holders 128, and the boundaries between the second legs 14 and the turn portions 16 are placed in contact with the second leg holders 130, whereby further insertion beyond this point is prevented. Stated otherwise, the segments 10 are positioned and fixed as a result of the turn portions 16 thereof being blocked. Therefore, the height positions of all of the segments 10, which are held by the first leg holders 128 and the second leg holders 130, are aligned.

Figure 8:
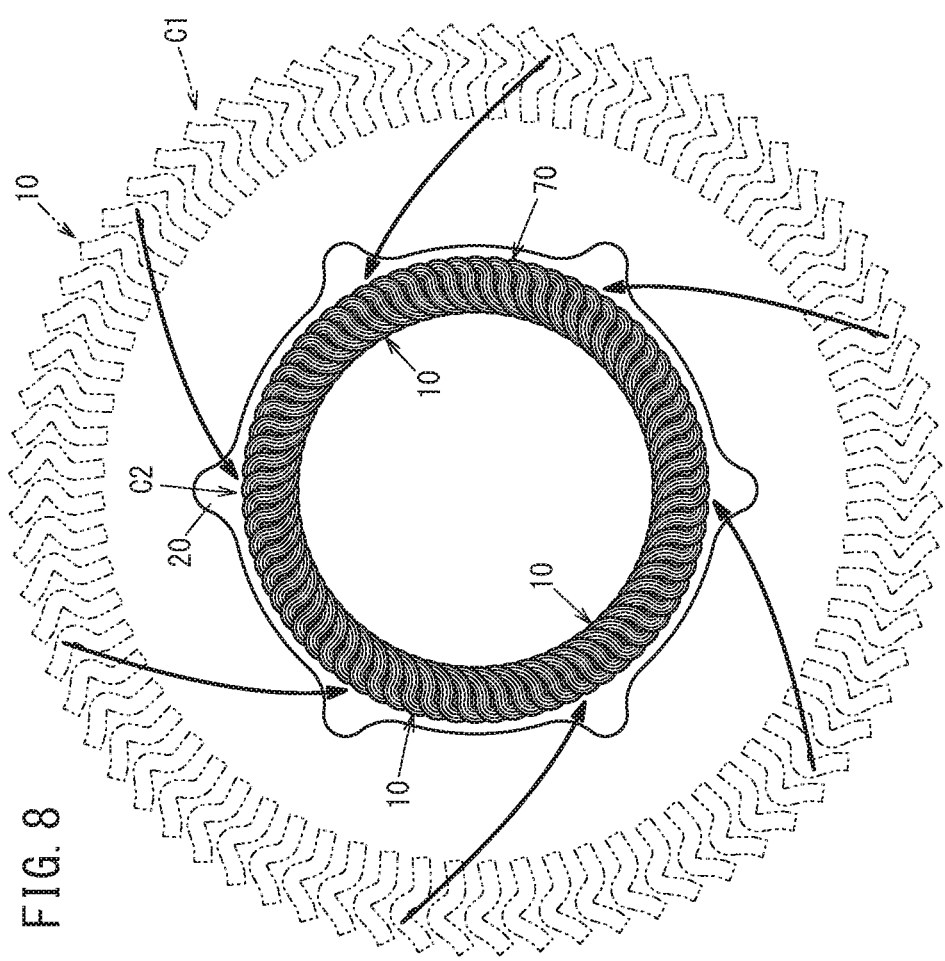
FIG. 8 is a schematic perspective view of essential parts showing a state in which segments are reduced in diameter and an annular shaped body is formed by the diameter reducing type of alignment mechanism of FIG. 6.

Since the first arm gears 116*a* through the fourth arm gears 116*d* are disposed so as to circle along the circumferences of the first gear support plate 102*a* through the fourth gear support plate 102*d*, as shown in FIG. 8, a virtual circle C1 is formed by the totality of the arm members 118 through the segments 10. Accordingly, in the second embodiment, the segments 10 are arranged in a circular shape.

Next, the main alignment step is performed. More specifically, the rotary shaft is urged to rotate, and the drive gear is rotated. Since the drive gear is enmeshed with the internal gears 112 provided on each of the four gear plates 104, in following relation with rotation of the drive gear, the four gear plates 104 rotate synchronously in the same direction (for example, counterclockwise).

Since the external gears 114 of the gear plates 104 are enmeshed with the first arm gears 116*a* through the fourth arm gears 116*d*, simultaneously with rotation of the gear plates 104, the first arm gears 116*a* through the fourth arm gears 116*d* also rotate in the same direction. Consequently, all of the arm members 118 are simultaneously rotated in a circumferential direction while moving inwardly of the imaginary circle C1 all at once. As a result, as shown in FIG. 8, the segments 10 converge on the same circumference of a new imaginary circle C2. In summary, according to the second embodiment, the segments 10 are transferred onto the new imaginary circle C2, which is formed by the virtual circle C1 being reduced in diameter, and the annular shaped body 70 is formed on the new imaginary circle C2.

The gear plates 104 are stopped when the stopper shafts 110 come into abutment against the terminal end portions of the arcuate holes 108. Stated otherwise, rotation of the gear plates 104 and the first arm gears 116*a* through the fourth arm gears 116*d* is brought to an end.

The segments 10 are aligned in a state in which the height positions thereof are aligned, as was described above. Accordingly, there is no need to adjust the heights of the segments 10.

Thereafter, a transport mechanism (for example, a robot) grips and lifts up the annular shaped body 70, and as a result, the first legs 12 and the second legs 14 are detached and separated from the first insertion holes 132 and the second insertion holes 134. The transport mechanism further conveys the annular shaped body 70 to the stator core 20, and inserts the first legs 12 and the second legs 14 into the slots thereof. Thereafter, the segments 10 are twisted as necessary, and the first legs 12 and the second legs 14 are further joined to the first legs 12 or the second legs 14 of other segments 10. Thus, the stator is obtained.

In the foregoing manner, according to the second embodiment as well, by a simple operation, a predetermined number of the segments 10 can be arranged and aligned so as to form the annular shaped body 70. Further, in order to obtain the annular shaped body 70, the segments 10, which have been aligned in a circular shape, may be rotated by rotation of the gear plates 104 and rotation of the arm members 118.

Accordingly, it is possible to constitute the diameter reducing type main alignment apparatus in a more compact manner, as compared with the alignment apparatus according to the conventional technique.

The present invention is not limited in particular to the first embodiment and the second embodiment described above, and various modifications are possible without departing from the essence and gist of the present invention.

For example, the alignment apparatus according to the second embodiment may also be configured to include the preliminary alignment mechanism 30 and the first transport mechanism.

Further, bottomed insertion holes may be formed in the first leg holders 128 and the second leg holders 130, and the first legs 12 and the second legs 14 may be inserted into the respective bottomed insertion holes. In this case, the respective distal ends of the first legs 12 and the second legs 14 may be blocked at the bottoms of the bottomed insertion holes. Along therewith, in the same manner as described above, the segments 10 are positioned and fixed in a state in which the height positions thereof are aligned.

What is claimed is:

1. An alignment method for aligning electric conductors in an annular shape, the electric conductors each having a substantially U shape formed of a first leg, a second leg extending substantially in parallel with the first leg, and a folded-back portion continuous with the first leg and the second leg, comprising:
    aligning the electric conductors into a plurality of arc-shaped modules, each of the arc-shaped modules being formed by stacking the folded-back portions of the electric conductors on one another;
    retaining the plurality of arc-shaped modules by a plurality of holders in a state in which at least one of the first legs or the second legs are supported; and
    aligning the electric conductors in the annular shape on a same circumference, comprising rotating and arranging the plurality of arc-shaped modules to insert the electric conductors in slots on the same circumference, by rotating the plurality of holders.

2. The alignment method for electric conductors according to claim 1, wherein the slots are slots of a stator core, and the first legs and the second legs of the electric conductors are inserted into the slots of a stator core to thereby construct a stator.

3. An alignment apparatus for aligning electric conductors in an annular shape, the electric conductors each having a substantially U shape formed of a first leg, a second leg extending substantially in parallel with the first leg, and a folded-back portion continuous with the first leg and the second leg, the alignment apparatus comprising:
    a preliminary alignment mechanism configured to align the electric conductors into a plurality of arc-shaped modules being formed of the electric conductors with the folded-back portions stacked on one another;
    a plurality of holders operably associated with the plurality of arc-shaped modules and configured to retain the plurality of arc-shaped modules in a state in which at least one of the first legs or the second legs thereof are supported;
    a transport mechanism operatively associated with the plurality of arc-shaped modules and configured to transport the plurality of arc-shaped modules from the preliminary alignment mechanism to the plurality of holders; and
    an alignment mechanism operatively associated with the transport mechanism and comprising a plurality of arm members in which the plurality of holders are disposed, wherein the plurality of arm members are configured to rotate the plurality of holders, and together therewith, rotate the plurality of arc-shaped modules, and align the electric conductors in the annular shape on a same circumference.

4. The alignment apparatus for electric conductors according to claim 3, wherein bottomed insertion holes into which one of the first legs or the second legs are inserted are formed in the plurality of holders, and distal ends of the first legs or the second legs are blocked at respective bottoms of the bottomed insertion holes to thereby position and fix the electric conductors.

5. The alignment apparatus for electric conductors according to claim 3, wherein the first legs and the second legs of the electric conductors are inserted into slots of a stator core to thereby construct a stator.

6. An alignment apparatus for aligning electric conductors in an annular shape, the electric conductors each having a substantially U shape formed of a first leg, a second leg extending substantially in parallel with the first leg, and a folded-back portion continuous with the first leg and the second leg, the alignment apparatus comprising:
 a plurality of holders of a transport mechanism configured to retain the plurality of arc-shaped modules in a state in which at least one of the first legs or the second legs thereof are supported; and
 an alignment mechanism operatively associated with the transport mechanism and configured to rotate the plurality of holders, causing rotation of the plurality of arc-shaped modules, and alignment of the electric conductors in the annular shape on a same circumference,
wherein:
 each of the plurality of holders comprises a first leg holder used to hold the first leg and a second leg holder adapted to hold the second leg;
 a first insertion hole of the first leg holder extends along upper and lower side surfaces of the first leg holder and comprises a first opening on an end face of the first leg holder that extends along a longitudinal direction of the first leg;
 a second insertion hole of the second leg holder extends along upper and lower side surfaces of the second leg holder and comprises a second opening on an end face of the second leg holder that extends along a longitudinal direction of the second leg; and
 the first opening and the second opening open in directions opposite to one another.

7. The alignment apparatus for electric conductors according to claim 6, wherein the alignment mechanism comprises:
 a plurality of arm members in which the plurality of holders are individually disposed;
 a plurality of gears connected respectively to ends of the individual arm members and arranged on a circumference;
 gear support plates on which the plurality of gears are disposed; and
 a rotating mechanism configured to rotate the plurality of gears.

* * * * *